(12) United States Patent
Saito et al.

(10) Patent No.: US 11,120,797 B2
(45) Date of Patent: Sep. 14, 2021

(54) INFORMATION PROCESSING TERMINAL, INFORMATION PROCESSING APPARATUS, AND INFORMATION PROCESSING METHOD

(71) Applicant: SONY CORPORATION, Tokyo (JP)

(72) Inventors: Mari Saito, Kanagawa (JP); Ayumi Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 16/473,105

(22) PCT Filed: Nov. 1, 2018

(86) PCT No.: PCT/JP2018/040662
§ 371 (c)(1),
(2) Date: Jun. 24, 2019

(87) PCT Pub. No.: WO2019/098037
PCT Pub. Date: May 23, 2019

(65) Prior Publication Data
US 2019/0348043 A1  Nov. 14, 2019

(30) Foreign Application Priority Data
Nov. 15, 2017  (JP) .............................. JP2017-219984

(51) Int. Cl.
*G06F 3/01* (2006.01)
*G10L 15/22* (2006.01)
*G10L 25/57* (2013.01)
*G10L 25/63* (2013.01)
*H04N 13/383* (2018.01)
(Continued)

(52) U.S. Cl.
CPC .............. *G10L 15/22* (2013.01); *G10L 25/57* (2013.01); *G10L 25/63* (2013.01); *G06F 3/011* (2013.01); *G10L 2015/223* (2013.01); *G10L 2015/225* (2013.01); *H04L 67/22* (2013.01); *H04N 13/359* (2018.05); *H04N 13/383* (2018.05)

(58) Field of Classification Search
CPC .... G06F 3/011; H04N 13/383; H04N 13/359; H04L 67/22
See application file for complete search history.

(56) References Cited

U.S. PATENT DOCUMENTS 9,380,294 B2 * 6/2016 King .................... H04N 13/368
2003/0052911 A1 * 3/2003 Cohen-solal ........ H04L 65/4076
715/738

(Continued)

FOREIGN PATENT DOCUMENTS

JP  6017545 B2 * 11/2016 ........... G06F 1/3287

*Primary Examiner* — Feng-Tzer Tzeng
(74) *Attorney, Agent, or Firm* — Paratus Law Group, PLLC

(57) ABSTRACT

There is provided an information processing terminal, an information processing apparatus, and an information processing method that are capable of presenting information by a method corresponding to the state of a user. The information processing apparatus of an aspect of the present technology estimates an attention state of a user and switches an output modal of content to be presented to the user according to the attention state of the user. The present technology can be applied to an apparatus having a voice assistant function of supporting the action of the user.

13 Claims, 18 Drawing Sheets

(51) Int. Cl.
*H04N 13/359* (2018.01)
*H04L 29/08* (2006.01)

(56) References Cited

U.S. PATENT DOCUMENTS

2014/0132505 A1* 5/2014 Vennelakanti .......... G06F 3/011
   345/156
2014/0215086 A1* 7/2014 Pitschel .................. H04L 67/26
   709/231

* cited by examiner

| Attention / Modal | Screen display | Sound output (TTS) |
|---|---|---|
| No | Image (slide show) | No |
| Yes | Image + Text | Yes |
| Short (glance) | Image (slide show) | Yes |

FIG.5

INFORMATION PROCESSING TERMINAL, INFORMATION PROCESSING APPARATUS, AND INFORMATION PROCESSING METHOD

CROSS REFERENCE TO PRIOR APPLICATION

This application is a National Stage Patent Application of PCT International Patent Application No. PCT/JP2018/040662 (filed on Nov. 1, 2018) under 35 U.S.C. § 371, which claims priority to Japanese Patent Application No. 2017-219984 (filed on Nov. 15, 2017), which are all hereby incorporated by reference in their entirety.

TECHNICAL FIELD

The present technology relates to an information processing terminal, an information processing apparatus, and an information processing method, and particularly to, an information processing terminal, an information processing apparatus, and an information processing method that are capable of presenting information by a method corresponding to the state of a user.

BACKGROUND ART

Devices having a voice assistant function that can be operated by a voice are attracting attention. Among the devices of so-called smart speakers, there is a device equipped with a display.

A user can request presentation of certain information by using a voice and can thus look at the information presented in response to the request or look at information presented actively by the device itself.

Patent Literature 1 discloses the technology of detecting an object, to which a user pays attention, on the basis of the user's line of sight to a display screen during reproduction of content and of presenting information regarding the detected object.

CITATION LIST

Patent Literature

Patent Literature 1: Japanese Patent Application Laid-open No. 2015-46089

DISCLOSURE OF INVENTION

Technical Problem

It is conceived that the case of the technology disclosed in Patent Literature 1 is effective if the user stays focused on looking at the content. However, it is conceived that, when viewing the content actually, the user looks at the content while performing another work or looks at the content while taking interest or losing interest in the matter.

The present technology has been made in view of the circumstances described above and is to enable information to be presented by a method corresponding to the state of a user.

Solution to Problem

An information processing terminal of an aspect of the present technology includes: an estimation unit that estimates an attention state of a user; and a presentation controller unit that switches an output modal of content to be presented to the user according to the attention state of the user.

An information processing apparatus of another aspect of the present technology includes: a communication unit that transmits content to an information processing terminal connected via a network, and receives information indicating a state of a user during presentation of the content, the information being transmitted from the information processing terminal; and a presentation controller unit that transmits presentation control information to the information processing terminal, the presentation control information specifying a presentation method for the content according to an attention state of the user with respect to the content, and controls an output modal of the content in the information processing terminal.

In the present technology, the attention state of the user is estimated, and the output modal of the content to be presented to the user is switched according to the attention state of the user.

Advantageous Effects of Invention

According to the present technology, it is possible to present information by a method corresponding to the state of a user.

It should be noted that the effects described herein are not necessarily limited and any one of the effects described in the present disclosure may be produced.

BRIEF DESCRIPTION OF DRAWINGS

FIG. 5 is a diagram showing a relationship between the attention state and an output modal.

MODE(S) FOR CARRYING OUT THE INVENTION

Hereinafter, modes for carrying out the present technology will be described. The description will be given in the following order.
1. Information Presentation in Information Processing System
2. Configuration of Each Apparatus
3. Operation of Each Apparatus
4. Modified Examples
5. Other Examples <Information Presentation in Information Processing System>

Figure 1:
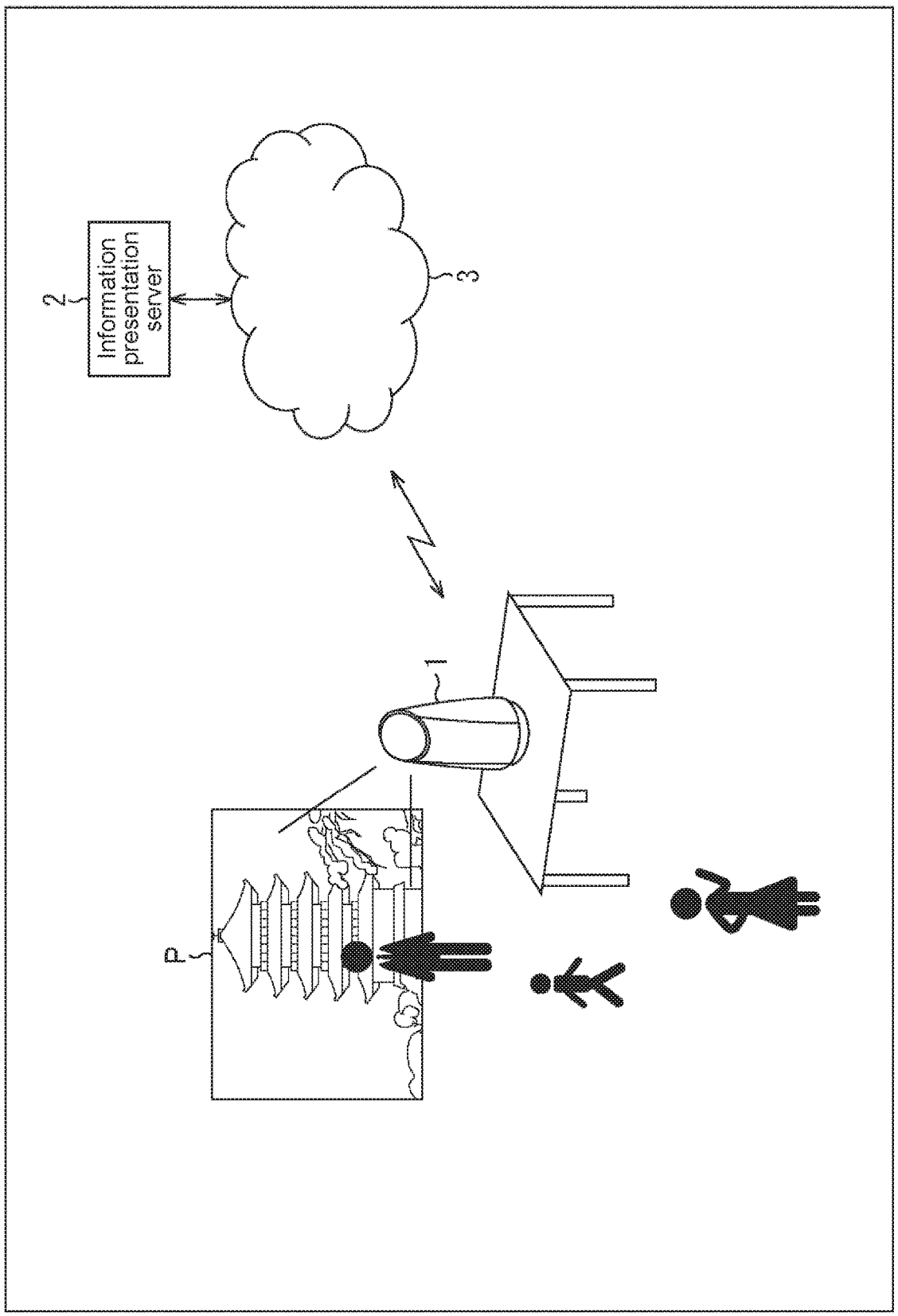
FIG. 1 is a diagram showing a configuration example of an information processing system according to an embodiment of the present technology.

FIG. 1 is a diagram showing a configuration example of an information processing system according to an embodiment of the present technology.

The information processing system of FIG. 1 is configured when an information processing terminal 1 and an information presentation server 2 are connected to each other via the Internet 3.

The information processing terminal 1 is an apparatus equipped with a so-called voice assistant function of performing various types of processing for supporting an action of a user by using AI (Artificial intelligence).

The function of the information processing terminal 1 is achieved by, for example, communicating with the information presentation server 2. For example, the information processing terminal 1 and the information presentation server 2 achieve various functions such as a function of retrieving information requested by the user and presenting the information, a function of managing a task of the user, and a function of transmitting an e-mail or a message of SNS (Social Networking Service).

The information processing terminal 1 is installed, for example, at a predetermined position of the home. The information processing terminal 1 is connected to the Internet 3 via a router (not shown) installed in the home, or the like. In the example of FIG. 1, the information processing terminal 1 is a stationary apparatus, but it may be a portable apparatus such as a smartphone, a tablet terminal, or a wristwatch-type wearable apparatus.

The information processing terminal 1 is mainly operated by a sound UI (User Interface). The information processing terminal 1 includes a microphone for collecting a voice uttered by the user and a speaker for outputting a synthetic sound to present various types of information to the user.

Further, the presentation of information is also performed by a screen UI. The information processing terminal 1 includes an image display device for displaying various screens, such as a projector or a display.

The information processing terminal 1 is a device having a role as an interface between the user and the information presentation server 2.

For example, as shown in FIG. 1, in a case where the user around the information processing terminal 1 speaks, the voice of the user is detected by the information processing terminal 1, and voice data is transmitted from the information processing terminal 1 to the information presentation server 2.

In the information presentation server 2, voice recognition, a semantic analysis of the details of the speech, and the like are performed on the basis of the voice data transmitted from the information processing terminal 1. For example, in a case where the user requests an information search, the information search is performed and search results are acquired as presentation information that is to be presented to the user. In the information presentation server 2, for example, a plurality of pieces of presentation information are acquired and transmitted to the information processing terminal 1.

The presentation information transmitted from the information presentation server 2 is received by the information processing terminal 1 and presented to the user by the image display device such as a projector.

In such a manner, for example, the user requests an information search by using a voice and can thus confirm search results from a screen displayed by the information processing terminal 1.

The presentation of information by using the output of a sound or the display on a screen is also performed by actively presenting the information acquired by the information presentation server 2 without needing a request of the user, in addition to presenting information corresponding to a request of the user.

Such information actively presented to the user from the information presentation server 2 side (information processing terminal 1 side) is referred to as recommended content. For example, the advertisements of content such as commodities, services, movies, and music are presented to the user as recommended content.

The recommended content includes, for example, an image such as a still image or a moving image, a text for display, and a text for TTS (Text-to-Speech) to be output as a sound after being subjected to TTS. Instead of the text for TTS, sound data for explaining the matter of content may be included in the recommended content.

The presentation of the recommended content is achieved by the information processing terminal 1 and the information presentation server 2, but it will be described that the information processing terminal 1 presents the recommended content as appropriate, for the sake of description.

In the example of FIG. 1, a presentation screen including an image P is projected onto a wall surface near the information processing terminal 1, so that the presentation of the recommended content is performed. The image P is an image regarding the recommended content. In the example of FIG. 1, a construction appears in the image.

Further, along with the presentation of the recommended content, music of BGM is output from the information processing terminal 1. The recommended content including the image P is acquired from the information presentation server 2 via the Internet 3. For example, a plurality of recommended content items are acquired from the information presentation server 2.

It should be noted that, in the example of FIG. 1, only the presentation of the image P and the output of BGM are performed, and a narration sound for explaining the matter of the recommended content is not output.

In such a manner, in a case where the information processing terminal 1 does not communicate with the user, the information processing terminal 1 has a function of producing a space by actively projecting an image of the recommended content and outputting the BGM without needing a request of the user.

Such presentation of recommended content by using the display of a screen is performed in a slide-show format in which the images of a plurality of recommended content items are sequentially switched for display at predetermined time intervals. In a room where the images of the recommended content items are reproduced by slide show, the user performs various types of work. The presentation of recommended content may be performed not in the slide-show format in which the images of a plurality of recommended content items are sequentially switched at predetermined time intervals, but by displaying a moving image.

During the slide-show reproduction of the images of the recommended content items, an attention state of the user is repetitively detected. A presentation method for the recommended content is switched according to the attention state of the user, presenting the recommended content.

Figure 2:
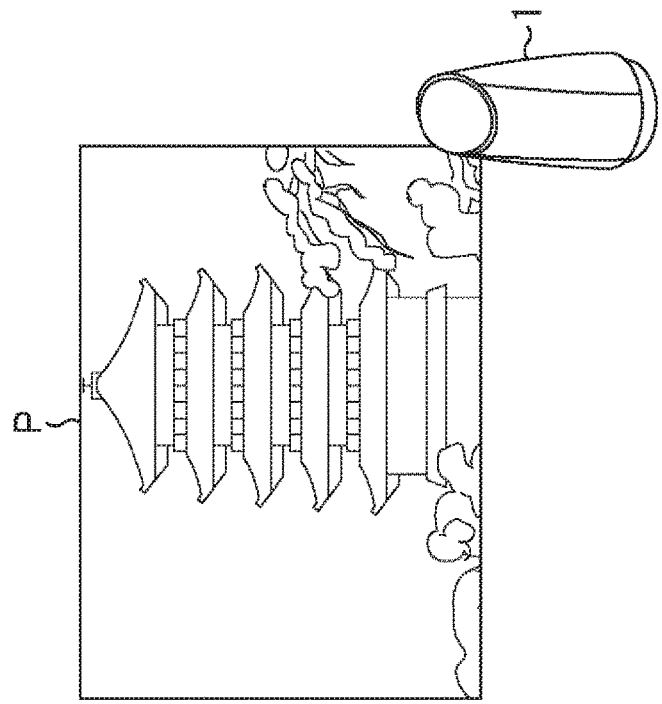
FIG. 2 is a diagram showing an example of presenting recommended content.
Figure 2:
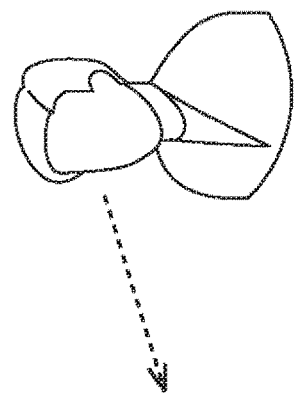

As indicated by the arrow of the broken line in FIG. 2, in a case where the user does not look at the image of the recommended content and a user's attention is not focused, the slide-show reproduction of the images of the recommended content items 1S continued. The recommended content items are switched at predetermined time intervals, and the images of each recommended content item are displayed. At that time, a narration sound is not output.

Here, the state where the user's attention is focused represents a state where the user is paying attention to the recommended content. Whether the user is paying attention to the recommended content or not determined on the basis of a direction of the user's line of sight, for example.

For example, when it is detected that the user's line of sight is directed to the recommended content for a predetermined period of time or longer, it is judged that the user's attention is focused. When the user is performing another work, looking at a region other than the presentation screen, or moving, a state where the user's attention is not focused is obtained.

Whether the attention is focused or not may be judged on the basis of a state of the user other than the line of sight, such as a position, a posture, an orientation of the body, or an orientation of the face of the user. In such a manner, the information processing terminal 1 also has functions of detecting the direction of the user's line of sight by analyzing an image captured by a camera and of detecting the attention state of the user.

Figure 3:
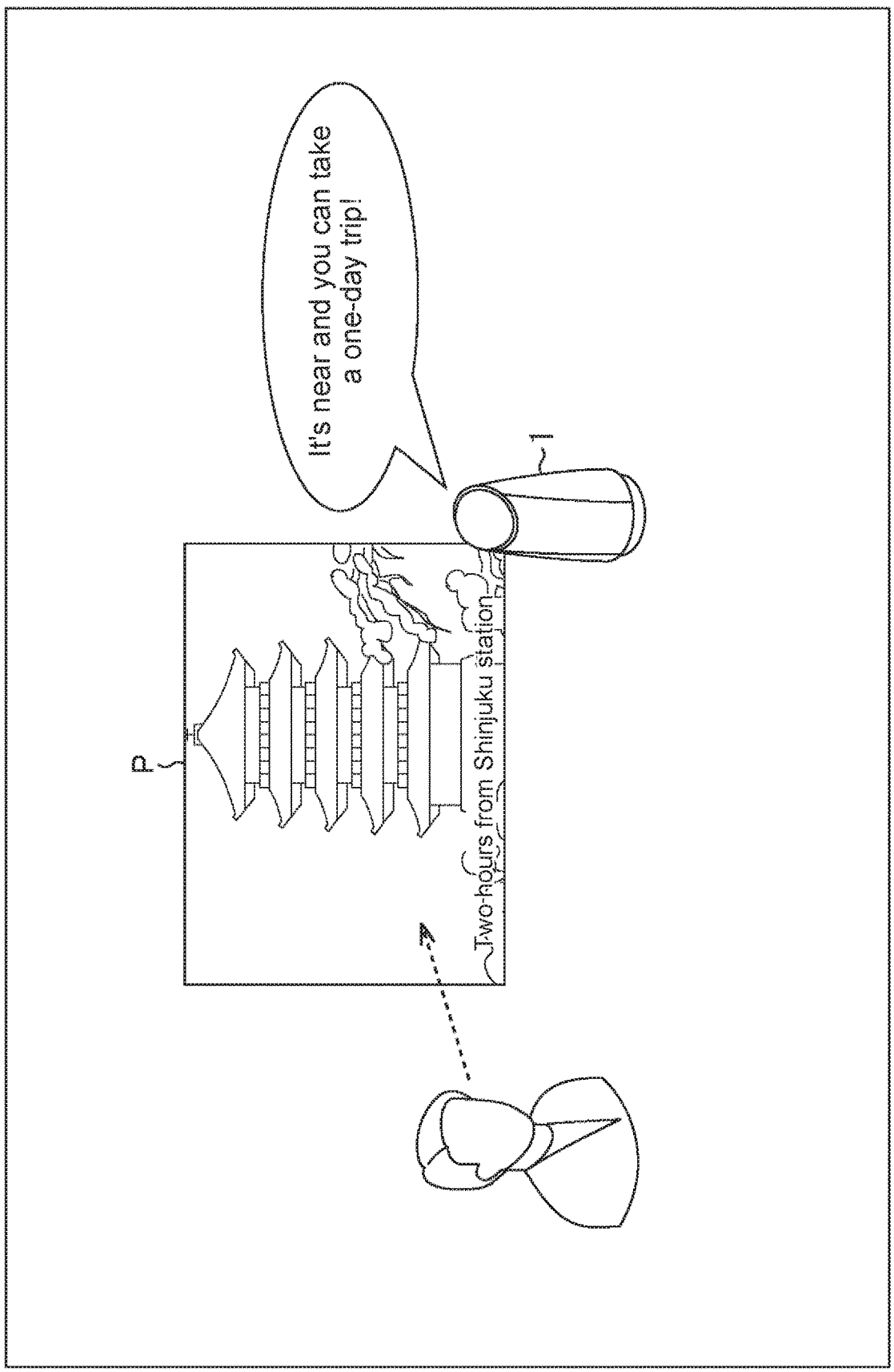
FIG. 3 is a diagram showing an example of presenting the recommended content according to an attention state.

FIG. 3 is a diagram showing an example of presenting the recommended content according to the attention state.

As indicated by the arrow of the broken line in FIG. 3, in a case where the user continues to look at the image P of the recommended content for a predetermined period of time or longer and the user's attention is focused, the information processing terminal 1 stops the slide-show reproduction of the images of the recommended content items and displays only an image regarding the recommended content that the user is looking at. In a case where there are a plurality of images regarding the recommended content that the user is looking at, the plurality of images are displayed.

Further, along with the display of the image regarding the recommended content that the user is looking at, the information processing terminal 1 outputs a narration sound regarding the matter of the recommended content as shown in a speech balloon. The narration sound is output on the basis of the text for TTS that is included in the recommended content. The recommended content may include voice data obtained by recording a voice of a person, and the narration sound may be output on the basis of the voice data.

Furthermore, the information processing terminal 1 causes a text regarding the matter of the recommended content to be superimposed on the image P of the recommended content for display. The display of the text is performed on the basis of the text for display, which is included in the recommended content.

For example, a text having the matter different from that of the text output by a sound is superimposed on the image P of the recommended content for display. In the example of FIG. 3, the sound of "It's near and you can take a one-day trip!" is output, whereas the text of "Two hours from the Shinjuku station.", which has the matter different from that of the sound, is displayed.

If the text for TTS is the same as the text for display and a sound of the same matter as that presented in the text for display is output, the same information as information that can be confirmed when seen is also presented by the sound, and the user feels intrusive with respect to that sound in some cases.

When the text for TTS is different from the text for display and a sound of the matter that is different from that presented in the text for display is output, the information processing terminal 1 can avoid giving such a feeling to the user.

For example, quantitative information that is quantitative information represented by numerical values is presented to the user by using the text and is not presented by using the narration sound. The narration sound is configured by, for example, selecting adjective or adverbial sentences that modify the recommended content.

The quantitative information is information that is difficult to understand when it is presented by a sound only. When the quantitative information is presented in text, the user can efficiently understand presented information.

The presentation of the recommended content as shown in FIG. 3 is continued while the user's attention is focused. The user can confirm the details of information regarding recommended content in which the user is interested, by reading a text superimposed and displayed on the image P and also by listening to a narration sound.

Figure 4:
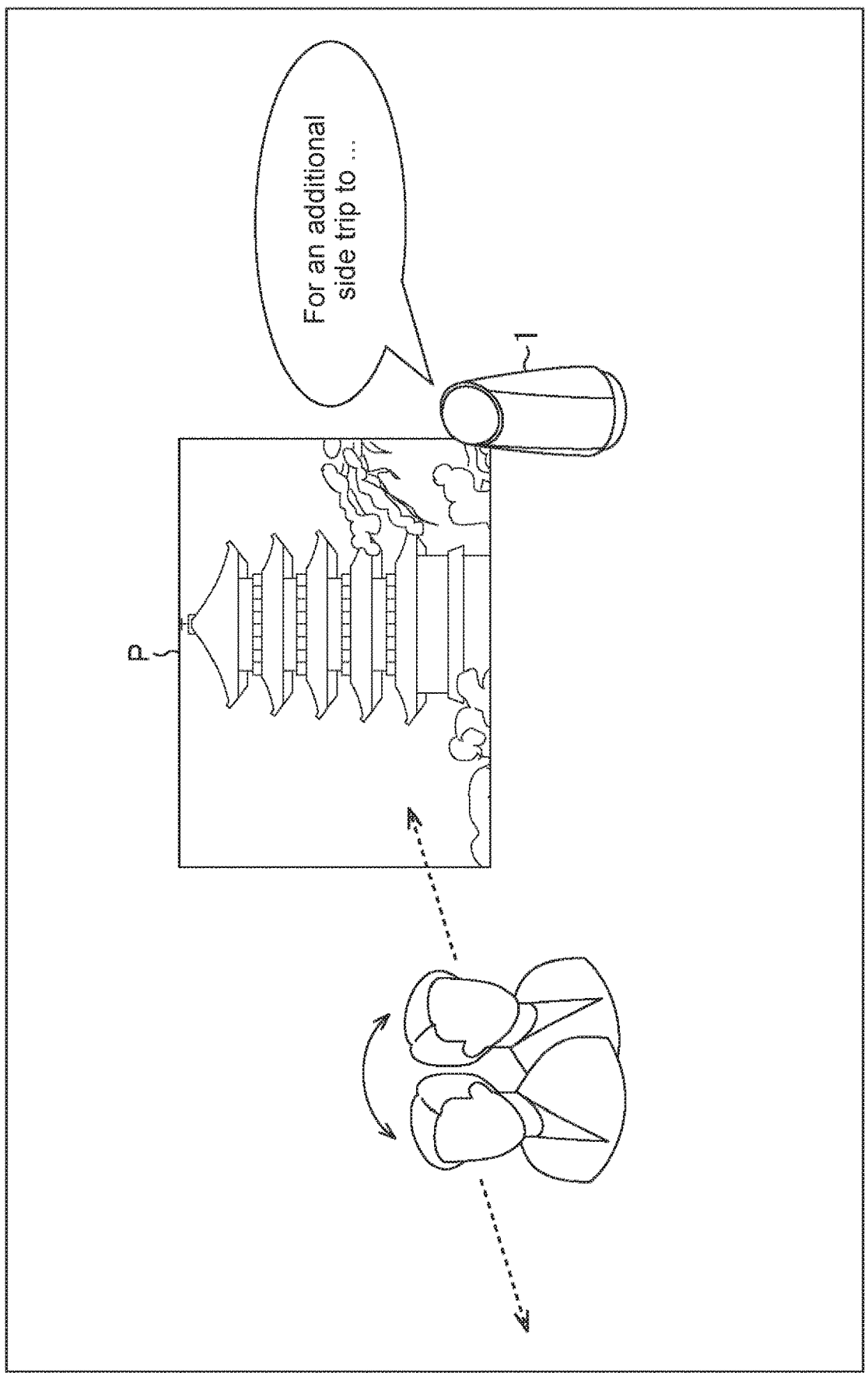
FIG. 4 is a diagram showing another example of presenting the recommended content according to the attention state.

FIG. 4 is a diagram showing another example of presenting the recommended content according to the attention state.

As indicated by the arrow of the broken line in FIG. 4, in a case where the user repetitively looks (glances) at the image P of the recommended content for a short period of time, the information processing terminal 1 causes the slide-show reproduction of the images of the recommended content items to be continued.

Further, the information processing terminal 1 causes a narration sound regarding the matter of the recommended content that the user has glanced at to be output. In the example of FIG. 4, the sound of "For an additional side trip to . . . " is output.

In such a manner, in a case where the user is interested in the recommended content but is difficult to look at the image with concentration, the information regarding the recommended content is presented by a sound. At that time, the superimposition display of the text on the image of the recommended content is not performed.

Thus, the user can listen to the information regarding the interesting recommended content by the narration sound while continuing working.

FIG. 5 is a diagram showing a relationship between the attention state of the user and a modal used for outputting the recommended content.

As described above, an output modal (output system) of the recommended content includes screen display and sound output.

As shown in the second line from the top of FIG. 5, in a case where the user's attention is not focused, the images of the respective recommended content items are displayed in the slide-show format by using the output modal of the screen display. At that time, a narration sound regarding the matter of the recommended content is not output.

As shown in the third line from the top, in a case where the user's attention is focused, an image of the recommended content in which the user is interested is displayed, and a text for display is also superimposed and displayed on the image by using the output modal of the screen display. Further, a narration sound regarding the matter of the recommended content is output by using the output modal of the sound output.

As shown in the fourth line from the top, in a case where the user attention is focused for a short period of time (in a case where the user's attention is intermittently focused), the images of the respective recommended content items are displayed in the slide-show format by using the output modal of the screen display. Further, a narration sound regarding the matter of the recommended content in which the user is interested is output using the output modal of the sound output. In a case where a period of time during which the attention continues is short in such a manner, the output of the narration sound has priority as the output modal used in the presentation of the recommended content. Also in a case where it is recognized that the user looks at the recommended content while working, processing similar to that performed when the period of time during which the user's attention is focused is short may be performed.

In such a manner, the presentation of the recommended content is configured mainly by the output of images such as a photo, a picture, and an illustration, and the output modal of supplementary information such as explanation is switched according to the attention state of the user.

Such presentation of the recommended content by using the screen display and sound output is dynamically switched according to the attention state of the user. In a case where the attention state of the user changes, the output modal is switched in convenient units. The presentation before and after the switching may overlap each other such that the narration sound or the text is not missed.

The presentation of the recommended content according to the attention state of the user is performed not only in a case where the information processing terminal 1 actively presents the recommended content but also in a case where the information processing terminal 1 presents the recommended content in response to a request of the user.

Figure 6:
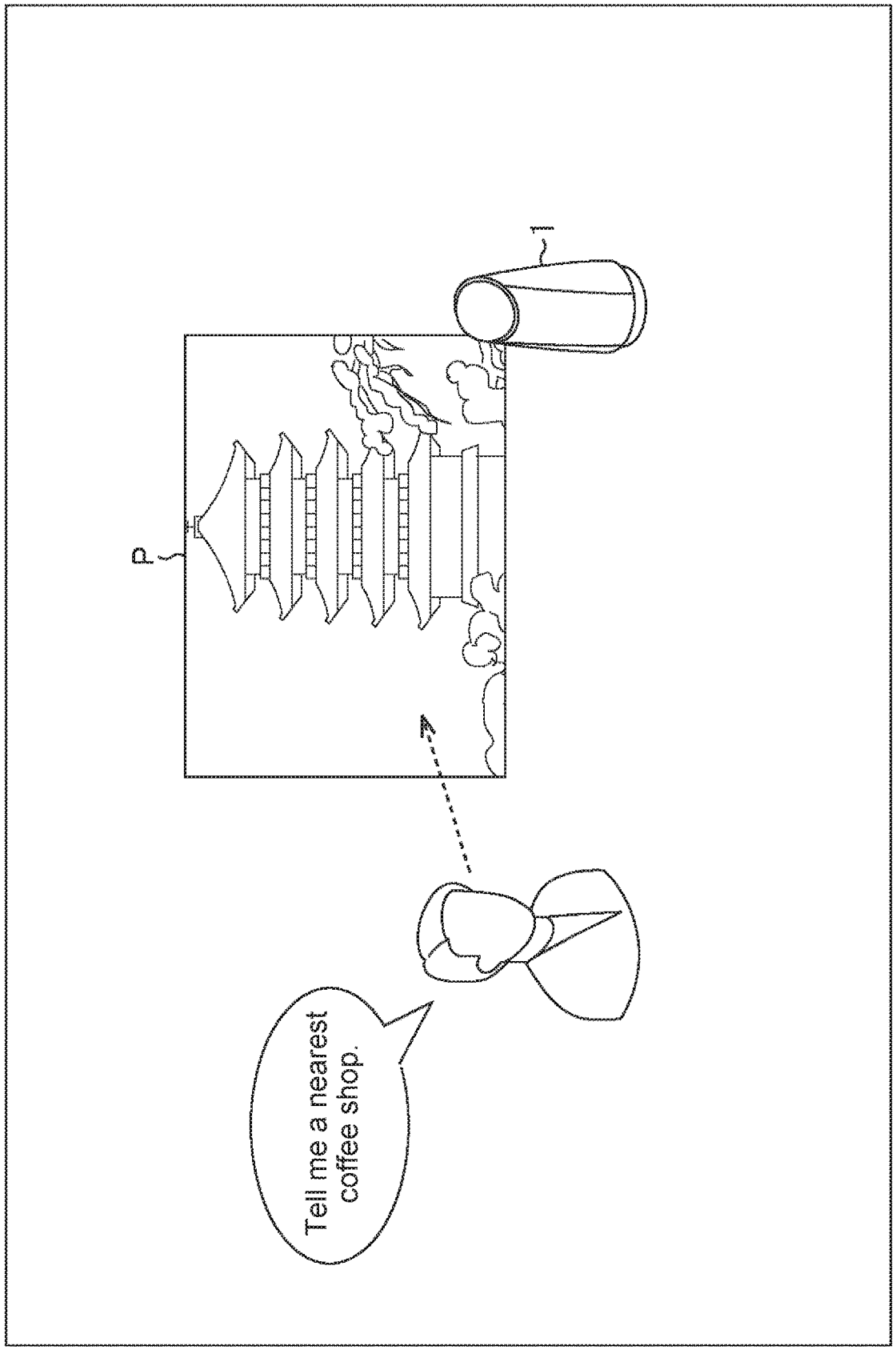
FIG. 6 is a diagram showing another example of presenting the recommended content according to the attention state.

FIG. 6 is a diagram showing another example of presenting the recommended content according to the attention state.

For example, it is assumed that an image of a sightseeing spot is displayed during the slide-show reproduction of the images of the recommended content items, and the user inquires by speaking "Tell me a nearest coffee shop." when looking at the image as indicated by the arrow of the broken line in FIG. 6.

At that time, the information processing terminal 1 judges that the user's attention is focused. Further, the voice data of the user is transmitted to the information presentation server 2.

In the information presentation server 2, an information search for coffee shops located near the sightseeing spot is performed on the basis of the voice of the user, and search results are transmitted to the information processing terminal 1.

Figure 7:
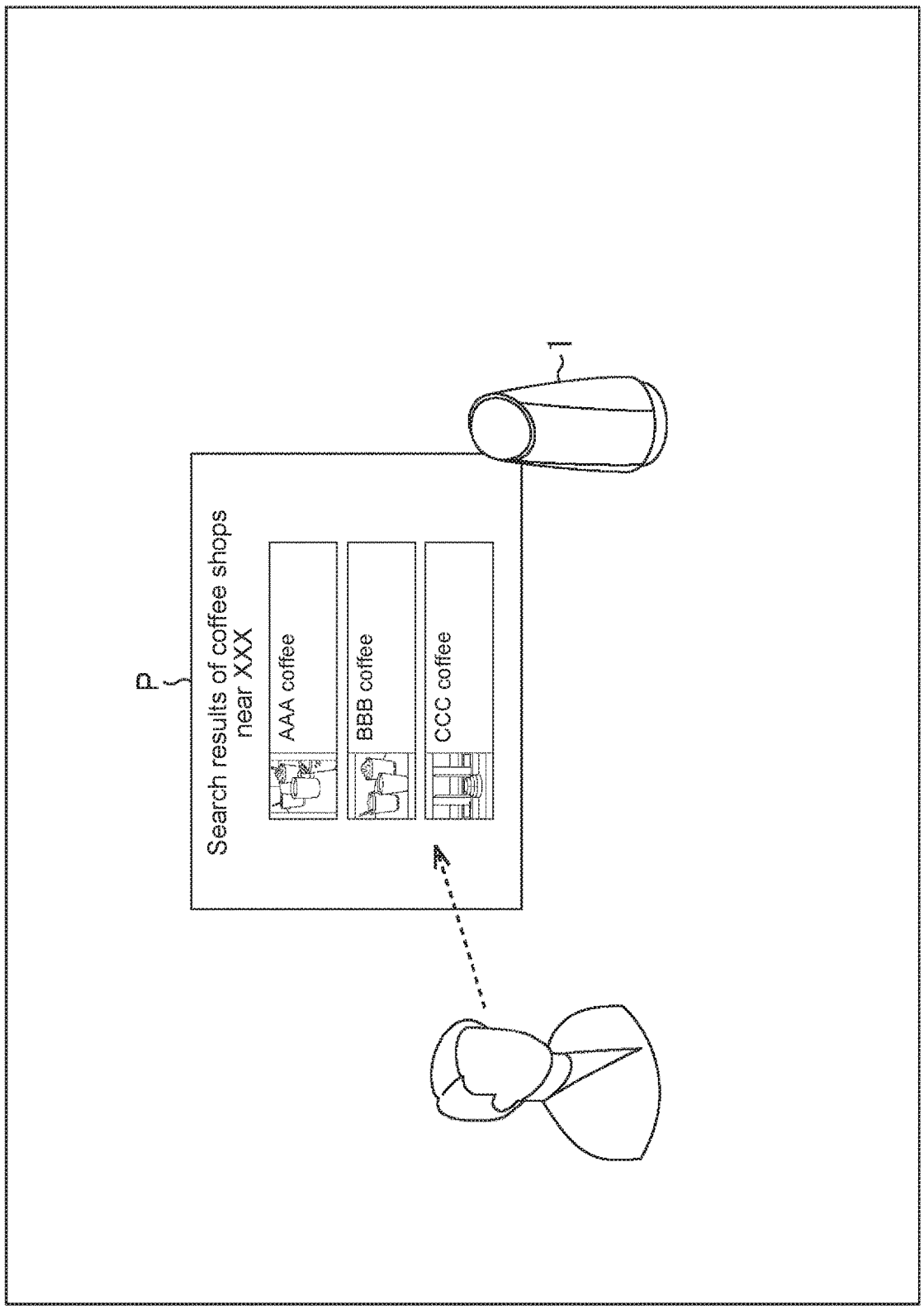
FIG. 7 is a diagram showing an example of presenting information search results in response to an inquiry of the user.

In a case where the user continues to look at the recommended content and thus the user's attention is focused, as shown in FIG. 7, the information processing terminal 1 presents information corresponding to the inquiry of the user by using the output modal of the screen display. In the example of FIG. 7, information of coffee shops located near the sightseeing spot specified by the user is displayed as search results.

Figure 8:
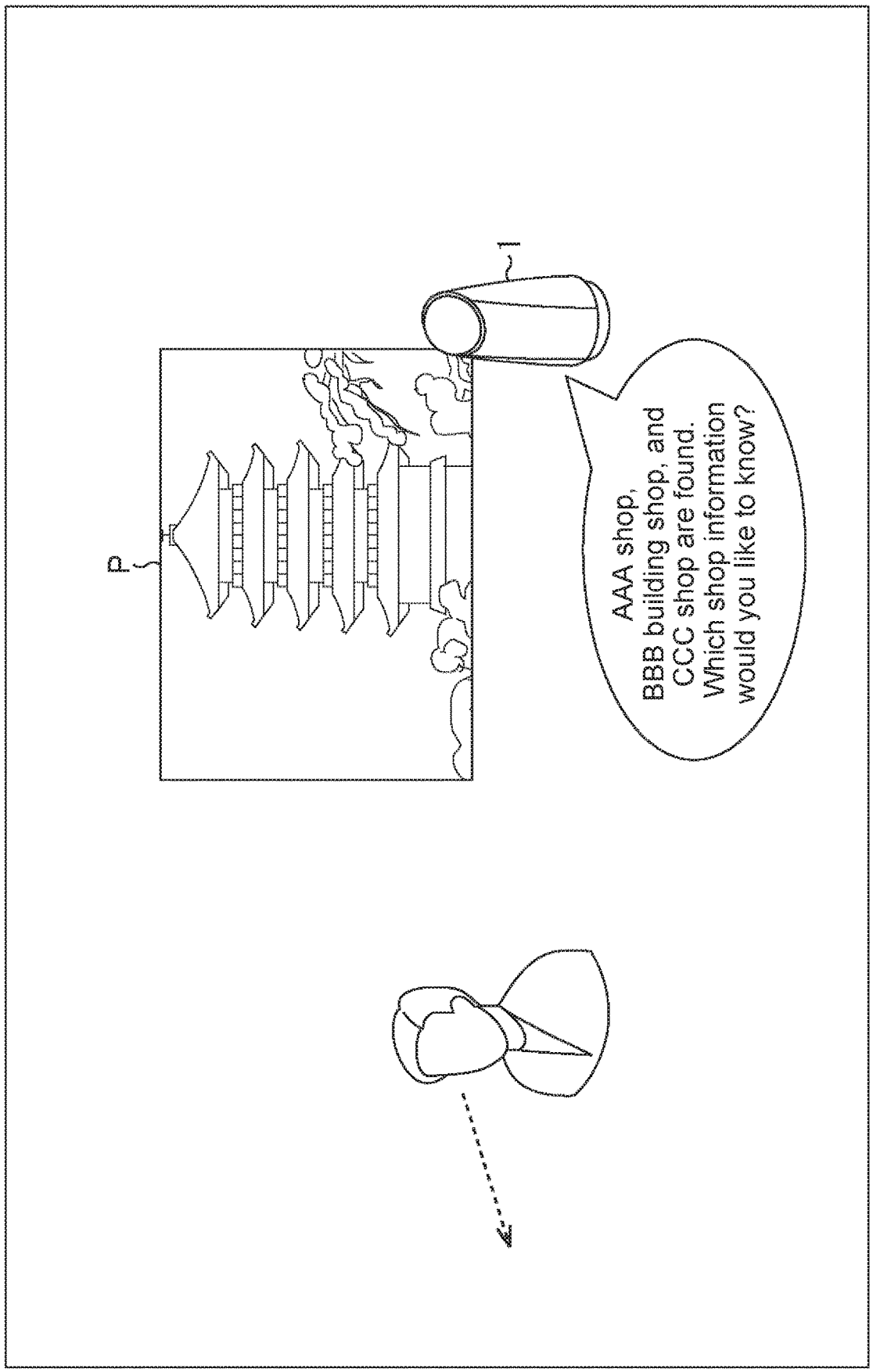
FIG. 8 is a diagram showing another example of presenting the information search results in response to the inquiry of the user.

Meanwhile, in a case where the inquiry of the user performed in a state where the attention is not focused, as shown in FIG. 8, information corresponding to the inquiry of the user is presented by using a sound.

In the example of FIG. 8, as the search results of the coffee shops located near the sightseeing spot, the sound of "AAA shop, BBB building shop, and CCC shop are found. Which shop information would you like to know?" is output.

In such a manner, the information processing terminal 1 performs presentation of information by switching the output modal according to the attention state of the user as described above, also in a case where the information corresponding to the inquiry of the user is presented.

The processing of the information processing terminal 1 and the information presentation server 2 that perform the above-mentioned presentation corresponding to the attention state of the user will be described later with reference to flowcharts.

<Configuration of Each Apparatus>

Configuration of Information Processing Terminal 1

Figure 9:
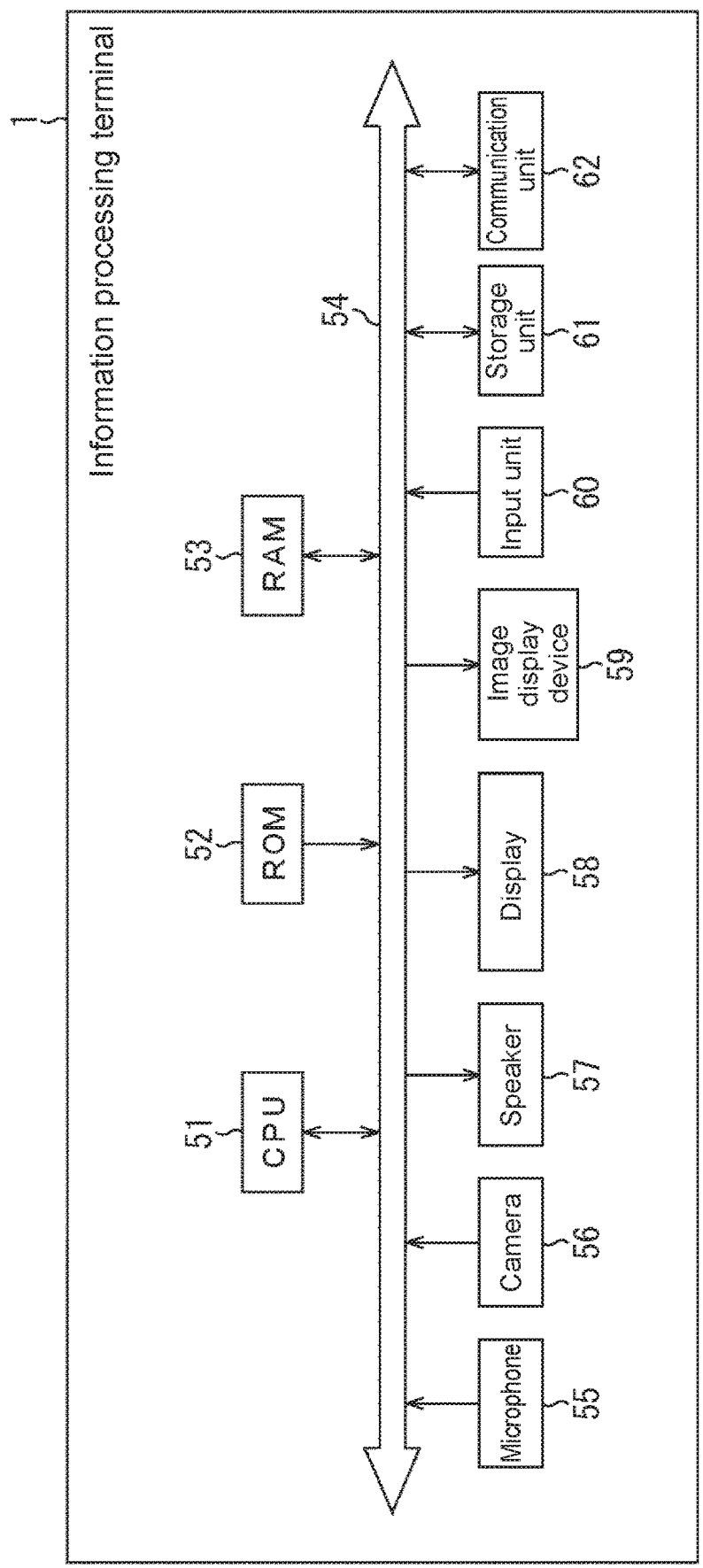
FIG. 9 is a block diagram showing a hardware configuration example of the information processing terminal.

FIG. 9 is a block diagram showing a hardware configuration example of the information processing terminal 1.

A CPU (Central Processing Unit) 51, a ROM (Read Only Memory) 52, and a RAM (Random Access Memory) 53 are connected to one another via a bus 54.

The CPU 51 executes a predetermined program and controls the whole operations of the information processing terminal 1.

A microphone 55, a camera 56, a speaker 57, a display 58, an image display device 59, an input unit 60, a storage unit 61, and a communication unit 62 are connected to the bus 54.

The microphone 55 detects a voice uttered by the user. Data of the voice detected by the microphone 55 is supplied to the communication unit 62 and transmitted to the information presentation server 2.

The camera 56 photographs the surroundings of the information processing terminal 1 and outputs a photographed image to the CPU 51. The image photographed by the camera 56 is also transmitted to the information presentation server 2 as appropriate. Various situations are determined on the basis of the image photographed by the camera 56.

The speaker 57 outputs a sound and music such as BGM.

The display 58 includes an LCD (Liquid Crystal Display), an organic EL (Electro Luminescence) display, or the like. The display 58 displays various screens such as a menu screen and a screen for search results.

The image display device 59 is a projector, for example. The image display device 59 projects various screens such as a presentation screen for recommended content on a wall surface, a floor surface, or the like.

The input unit 60 includes a touch panel provided to be superimposed on the display 58, and various buttons provided to the casing of the information processing terminal 1.

The input unit 60 detects an operation made by the user and outputs information representing the details of the operation.

The storage unit 61 includes a nonvolatile memory or the like. The storage unit 61 stores various types of data such as a program to be executed by the CPU 51.

The communication unit 62 includes a network interface and the like. The communication unit 62 performs communication with the information presentation server 2 via the Internet 3.

The information processing terminal 1 may include various sensors such as an acceleration sensor, a gyro sensor, and a positioning sensor.

Figure 10:
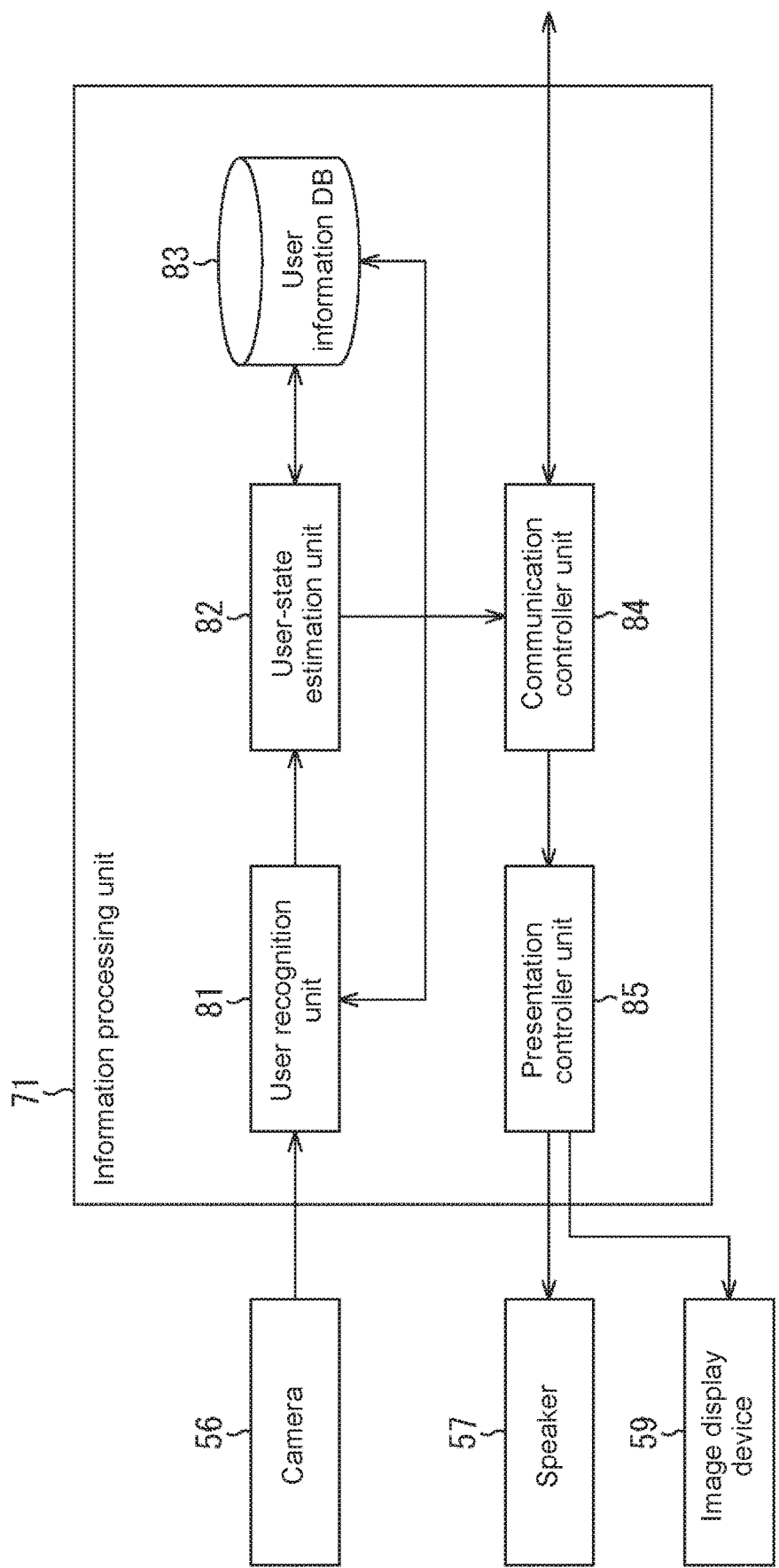
FIG. 10 is a block diagram showing a functional configuration example of the information processing terminal.

FIG. 10 is a block diagram showing a functional configuration example of the information processing terminal 1. At least a part of the configuration shown in FIG. 10 is achieved by the CPU 51 of FIG. 9 when executing a predetermined program.

As shown in FIG. 10, in the information processing terminal 1, an information processing unit 71 is achieved. The information processing unit 71 includes a user recognition unit 81, a user-state estimation unit 82, a user information DB 83, a communication controller unit 84, and a presentation controller unit 85.

The user recognition unit 81 analyzes the image photographed by the camera 56 and detects (recognizes) a user around the information processing terminal 1. Further, the user recognition unit 81 detects a direction of the line of sight of the recognized user, or the like. For example, the user information DB 83 stores information used for recognition of the user, determination of a direction of the line of sight, or the like. The processing of the user recognition unit 81 is performed as appropriate on the basis of the information stored in the user information DB 83. The user recognition unit 81 outputs the information indicating the direction of the line of sight of the recognized user to the user-state estimation unit 82.

When judging whether the attention is focused or riot on the basis of a position, a posture, an orientation of the body, or the like of the user, the user recognition unit 81 determines those states of the user on the basis of the image photographed by the camera 56. Various types of information indicating the state of the user, which is determined by the user recognition unit 81, are supplied to the user-state estimation unit 82.

The state of the user may be determined not only on the basis of the image photographed by the camera 56 but also on the basis of information detected by another sensor provided to the information processing terminal 1. Further, the state of the user may be determined on the basis of the information detected by an apparatus external to the information processing terminal 1, such as a portable terminal carried by the user.

The user-state estimation unit 82 refers to the information stored in the user information DB 83 as appropriate and estimates the attention state of the user recognized by the user recognition unit 81. The information indicating an estimation result of the attention state, which is estimated by the user-state estimation unit 82, is supplied to the communication controller unit 84.

The communication controller unit 84 controls the communication unit 62 to perform communication with the information presentation server 2. For example, the communication controller unit 84 transmits the information indicating an estimation result of the attention state, which is supplied from the user-state estimation unit 82, to the information presentation server 2. The information presentation server 2 receives the information indicating an estimation result of the attention state and then transmits presentation control information that specifies a presentation method for the recommended content.

Further, the communication controller unit 84 receives the presentation control information transmitted from the information presentation server 2, outputs the presentation control information to the presentation controller unit 85. The communication controller unit 84 also receives the recommended content transmitted from the information presentation server 2.

The presentation controller unit 85 controls the speaker 57 and the image display device 59 to present the recommended content transmitted from the information presentation server 2. Further, the presentation controller unit 85 controls the presentation of the recommended content by, for example, switching the output modal according to the presentation control information transmitted from the information presentation server 2.

Configuration of Information Presentation Server 2

Figure 11:
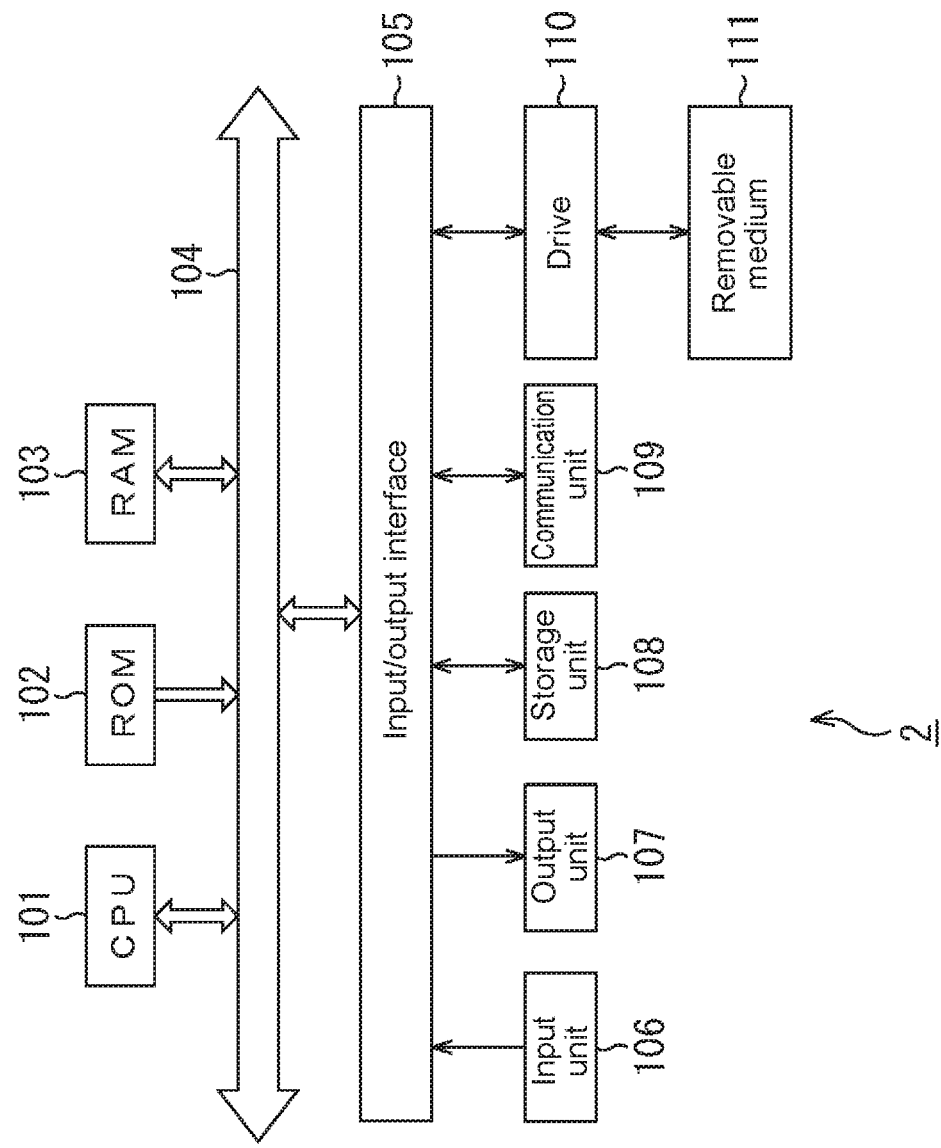
FIG. 11 is a block diagram showing a hardware configuration example of an information presentation server.

FIG. 11 is a block diagram showing a hardware configuration example of the information presentation server 2.

A CPU 101, a ROM 102, and a RAM 103 are connected to one another via a bus 104.

An input/output interface 105 is further connected to the bus 104. An input unit 106 including a keyboard, a mouse, or the like, and an output unit 107 including a display, a speaker, or the like are connected to the input/output interface 105. Further, a storage unit 108 including a hard disk, a nonvolatile memory, or the like, a communication unit 109 including a network interface or the like, and a drive 110 that drives a removable medium 111 are connected to the input/output interface 105.

In this example, the information presentation server 2 is configured by a single computer, but it may be configured by a plurality of computers. When the plurality of computers cooperate to perform processing, the function of the information presentation server 2 is achieved.

Figure 12:
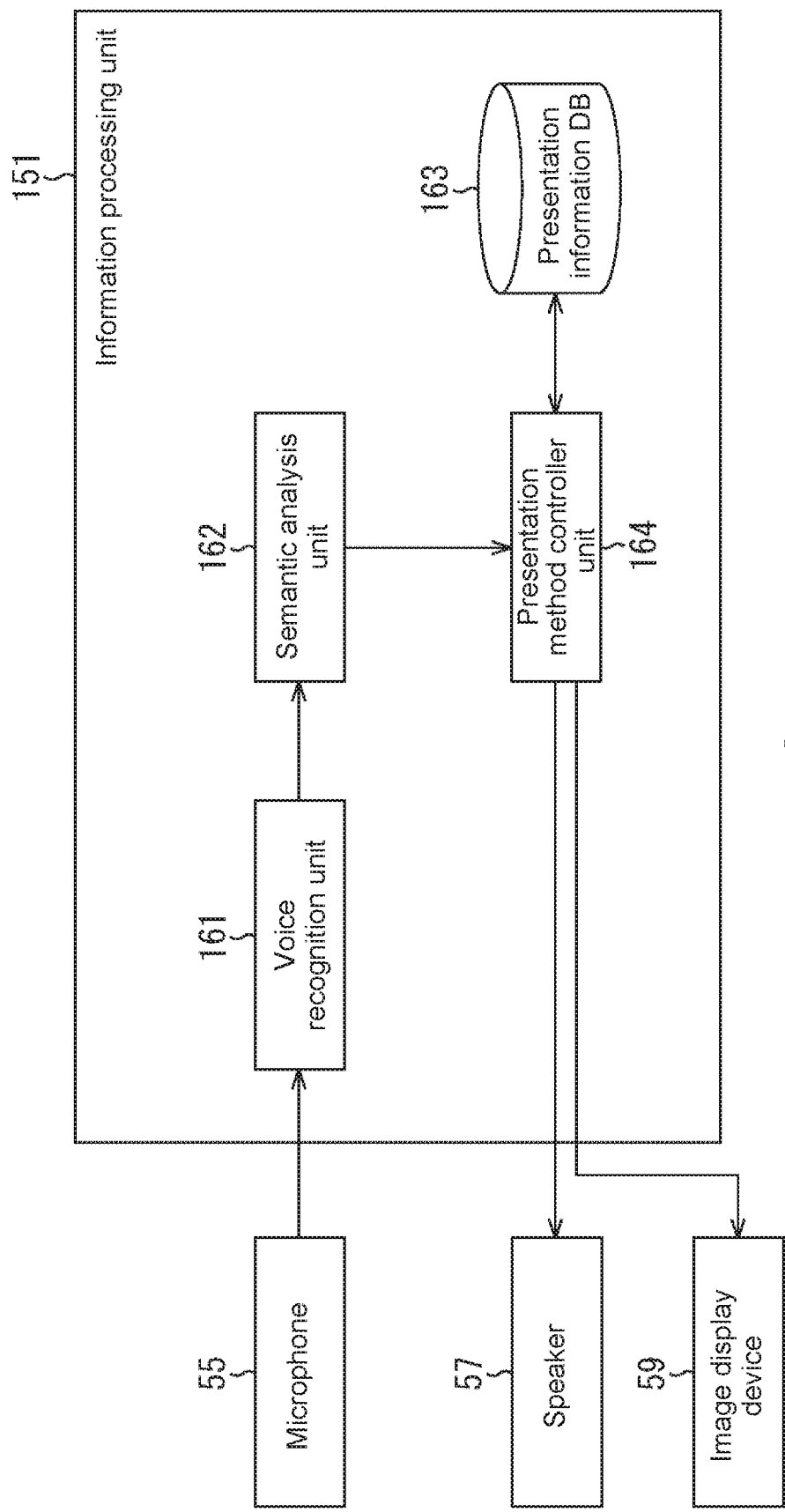
FIG. 12 is a block diagram showing a functional configuration example of the information presentation server.

FIG. 12 is a block diagram showing a functional configuration example of the information presentation server 2. At least a part of the configuration shown in FIG. 12 is achieved by the CPU 101 of FIG. 11 when executing a predetermined program.

As shown in FIG. 12, in the information presentation server 2, an information processing unit 151 is achieved. The information processing unit 151 includes a voice recognition unit 161, a semantic analysis unit 162, a presentation information DB 163, and a presentation method controller unit 164.

It should be noted that FIG. 12 shows the microphone 55, the speaker 57, and the image display device 59 that are the configuration of the information processing terminal 1 for the sake of description. When the user speaks, the speech is detected by the microphone 55 accordingly, and voice data transmitted from the information processing terminal 1 is received in the communication unit 109 and input to the voice recognition unit 161.

Further, the recommended content and the presentation control information that are output by the presentation method controller unit 164 are transmitted from the communication unit 109 to the information processing terminal 1 and then used for reproduction of a sound in the speaker 57 and used for display of a screen in the image display device 59.

The information indicating the attention state of the user, which is estimated in the information processing terminal 1 and transmitted from the information processing terminal 1, is received in the communication unit 109 and input to the presentation method controller unit 164.

The voice recognition unit 161 recognizes the voice of the user and outputs a character string indicating a recognition result to the semantic analysis unit 162.

The semantic analysis unit 162 analyzes the meaning of the details of the user's speech on the basis of the character string supplied from the voice recognition unit 161. Information indicating an analysis result of the meaning of the user's speech is supplied to the presentation method controller unit 164.

The presentation method controller unit 164 reads the recommended content from the presentation information DB 163 and acquires and transmits the recommended content to the information processing terminal 1. Further, the presentation method controller unit 164 generates presentation control information that specifies a presentation method for the recommended content, on the basis of the information indicating the attention state of the user, which is transmitted from the information processing terminal 1, and transmits the presentation control information to the information processing terminal 1. The presentation control information includes information that specifies the output modal, and the like.

Further, in a case where the user requests an information search, the presentation method controller unit 164 reads information to be presented as a search result, from the presentation information DB 163, on the basis of the analysis result of the semantic analysis unit 162, and acquires that information.

The presentation information DB 163 stores various types of information to be presented to the user. The information to be presented to the user may be acquired from another server on the Internet 3 or another apparatus such as a portable terminal of the user. The presentation method controller unit 164 transmits the information to be presented to the user to the information processing terminal 1.

<Operation of Each Apparatus>

Here, the operations of the information processing terminal 1 and the information presentation server 2 will be described.

Operation of Information Processing Terminal 1

First, the processing of the information processing terminal 1 will be described with reference to a flowchart of FIG. 13.

Figure 13:
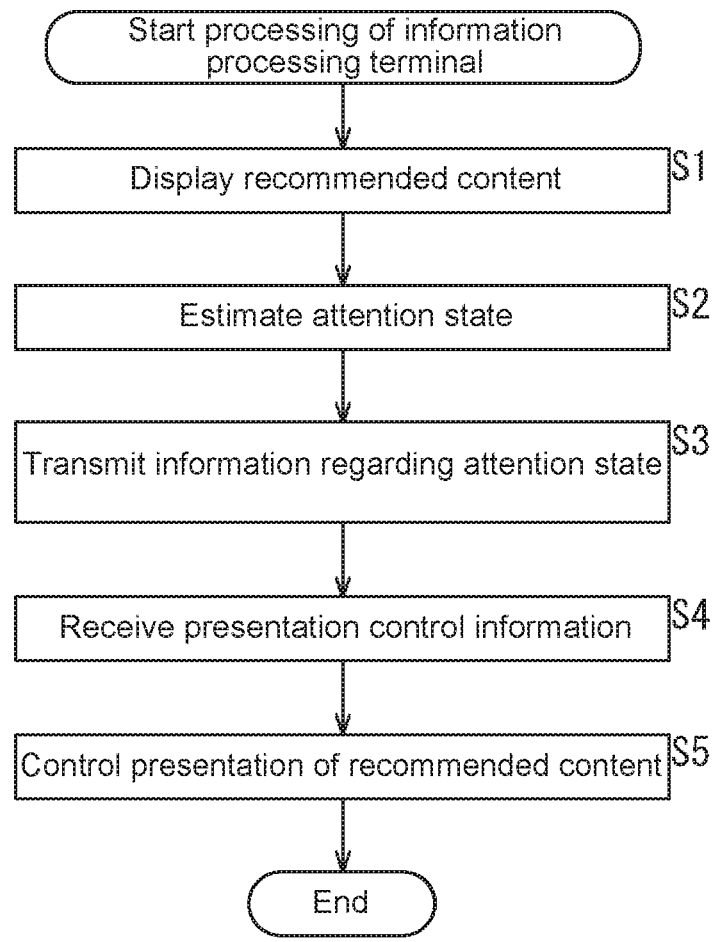
FIG. 13 is a flowchart for describing processing of the information processing terminal.

The processing of FIG. 13 is started when, for example, the recommended content is transmitted from the information presentation server 2. The recommended content received in the communication unit 62 is acquired by the communication controller unit 84 and supplied to the presentation controller unit 85.

In Step S1, the presentation controller unit 85 controls the image display device 59 to display the recommended content transmitted from the information presentation server 2. Here, the slide-show reproduction of images of a plurality of recommended content items is performed.

While the slide-show reproduction of the images of the recommended content items is being performed, the user recognition unit 81 recognizes a user and detects the direction of the line of sight on the basis of the image photographed by the camera 56.

In Step S2, the user-state estimation unit 82 estimates the attention state of the user near the information processing terminal 1 on the basis of information indicating the direction of the line of sight, which is detected by the user recognition unit 81.

In Step S3, the communication controller unit 84 transmits information indicating an estimation result of the attention state to the information presentation server 2. Transmission of the information indicating an estimation result of the attention state to the information presentation server 2 is repetitively performed while the slide-show reproduction of the images of the recommended content items is being performed. The information presentation server 2, which receives the information indicating an estimation result of the attention state, transmits presentation control information that specifies a presentation method for the recommended content.

In Step S4, the communication controller unit 84 receives the presentation control information transmitted from the information presentation server 2.

In Step S5, the presentation controller unit 85 controls the presentation of the recommended content on the basis of the presentation control information. Under the control of the presentation controller unit 85, the presentation of the recommended content is performed by using each of the output modals described with reference to FIG. 5.

Operation of Information Presentation Server 2

Next, the processing of the information presentation server 2 will be described with reference to a flowchart of FIG. 14.

Figure 14:
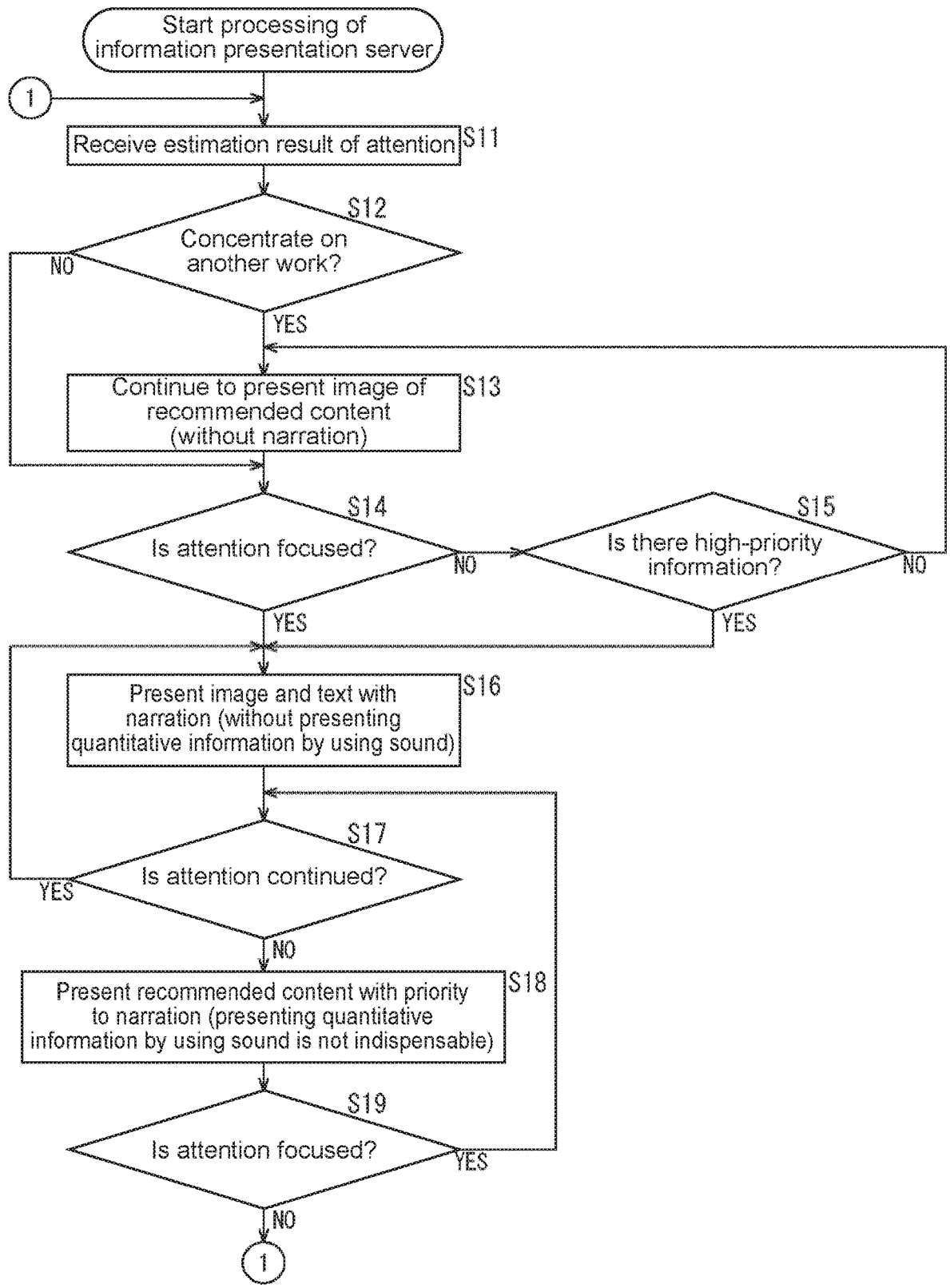
FIG. 14 is a flowchart for describing processing of the information presentation server.

The processing of FIG. 14 is started when the information indicating an estimation result of the attention state of the user is transmitted from the information processing terminal 1.

In Step S11, the presentation method controller unit 164 receives the information indicating an estimation result of the attention state, which is transmitted from the information processing terminal 1.

In Step S12, the presentation method controller unit 164 judges whether the user concentrates on another work or not on the basis of the estimation result of the attention state.

When judging in Step S12 that the user concentrates on another work, in Step S13, the presentation method controller unit 164 transmits the presentation control information to the information processing terminal 1 and causes the information processing terminal 1 to continue the slide-show reproduction of the images of the recommended content items. In the information processing terminal 1, the images of the recommended content items are presented in the slide-show format, and a narration sound is not output.

When judging in Step S12 that the user does not concentrate on another work, the processing of Step S13 is skipped. For example, in a case where the line of sight of the user is directed to the images of the recommended content even for a short period of time, it is judged that the user does not concentrate on another work.

In Step S11, the presentation method controller unit 164 judges whether the user's attention is focused or not.

When judging in Step S14 that the attention is not focused, in Step S15, the presentation method controller unit 164 judges whether or not there is high-priority information necessary to be presented to the user.

When judging in Step S15 that there is no high-priority information, the presentation method controller unit 164 returns to Step S13 and repeats similar processing.

Meanwhile, when judging in Step S14 that the attention is focused, in Step S16, the presentation method controller unit 164 transmits the presentation control information to the information processing terminal 1 and causes the information processing terminal 1 to present an image and text with narration.

In other words, in the information processing terminal 1, the text for display, which is superimposed on the image of the recommended content, is displayed and a narration sound is also output. Here, quantitative information is not presented by the output sound.

Also in the case of judging in Step S15 that there is high-priority information, in Step S16, an image and text with narration is presented.

In such a manner, in a case where there is high-priority information, the user's line of sight may be caused to be directed to the image of the recommended content such that the attention is forcibly focused, and then information may be presented. In a case where the narration sound is output such that the attention is forcibly focused, the user-state estimation unit 82 estimates a subsequent reaction of the user.

For example, if the motion is imparted to the display of the image of the recommended content to detect whether the user's line of sight follows the motion or not, the reaction of the user is estimated. In a case where the user's line of sight follows the motion in the image of the recommended content, it is estimated that the user does not ignore the recommended content, and in a case where the user's line of sight does not follow the motion, it is estimated that the user ignores the recommended content. The information indicating an estimation result of the user-state estimation unit 82 is transmitted to the information presentation server 2.

In a case where the user ignores the recommended content in a second, the presentation method controller unit 164, which receives the information indicating an estimation result of the user-state estimation unit 82, controls the presentation of the recommended content in the information processing terminal 1 so as to return to a normal state in which the slide-show reproduction is performed.

In Step S17, the presentation method controller unit 164 judges whether the state where the user's attention is focused is continued or not.

When judging in Step S17 that the state where the attention is focused is continued, the presentation method controller unit 164 returns to Step S16, and the presentation of an image and text with narration is continued.

Meanwhile, when judging in Step S17 that the attention is not continued, in Step S18, the presentation method controller unit 164 transmits the presentation control information to the information processing terminal 1 and causes the information processing terminal 1 to present the recommended content with priority to narration.

In the information processing terminal 1, the slide-show reproduction of the images of the recommended content items is continued, and a narration sound for explaining the matter of the recommended content is output. Here, quantitative information may be presented or may not be presented to the user by the output sound.

In Step 819, the presentation method controller unit 164 judges whether the user's attention is focused or not.

When judging in Step S19 that the attention is focused, the presentation method controller unit 164 returns to Step S17, and the presentation of the recommended content is continued according to the attention state of the user.

Meanwhile, when judging in Step S19 that the attention is not focused, the presentation method controller unit 164 returns to Step S11 and repeats the above processing.

By the above processing, the information processing terminal 1 can present the recommended content on the basis of the attention state of the user.

MODIFIED EXAMPLES

The presentation of the recommended content is controlled on the basis of the attention state of the user, but it may be controlled on the basis of another state of the user, such as the position of the user.

For example, in a case where the user stays or is estimated to stay at a position from which the user cannot look at an image of the recommended content, the quantitative information may be exceptionally presented by a narration sound together with the matter of the recommended content. In this case, the presentation of the quantitative information by using the sound is performed by reducing a speech rate or repeating the speech.

Further, for example, in a case where the user stays at a position at which the user has difficulty of listening to the narration sound or in a case where another sound is being output, qualitative information to be presented by the speech may also be presented exceptionally by using the output modal of the screen display.

Hereinabove, the case where the number of users to whom the recommended content is presented is one has been described, but the above-mentioned processing can also be applied to a case where information is presented to a plurality of users.

Figure 15:
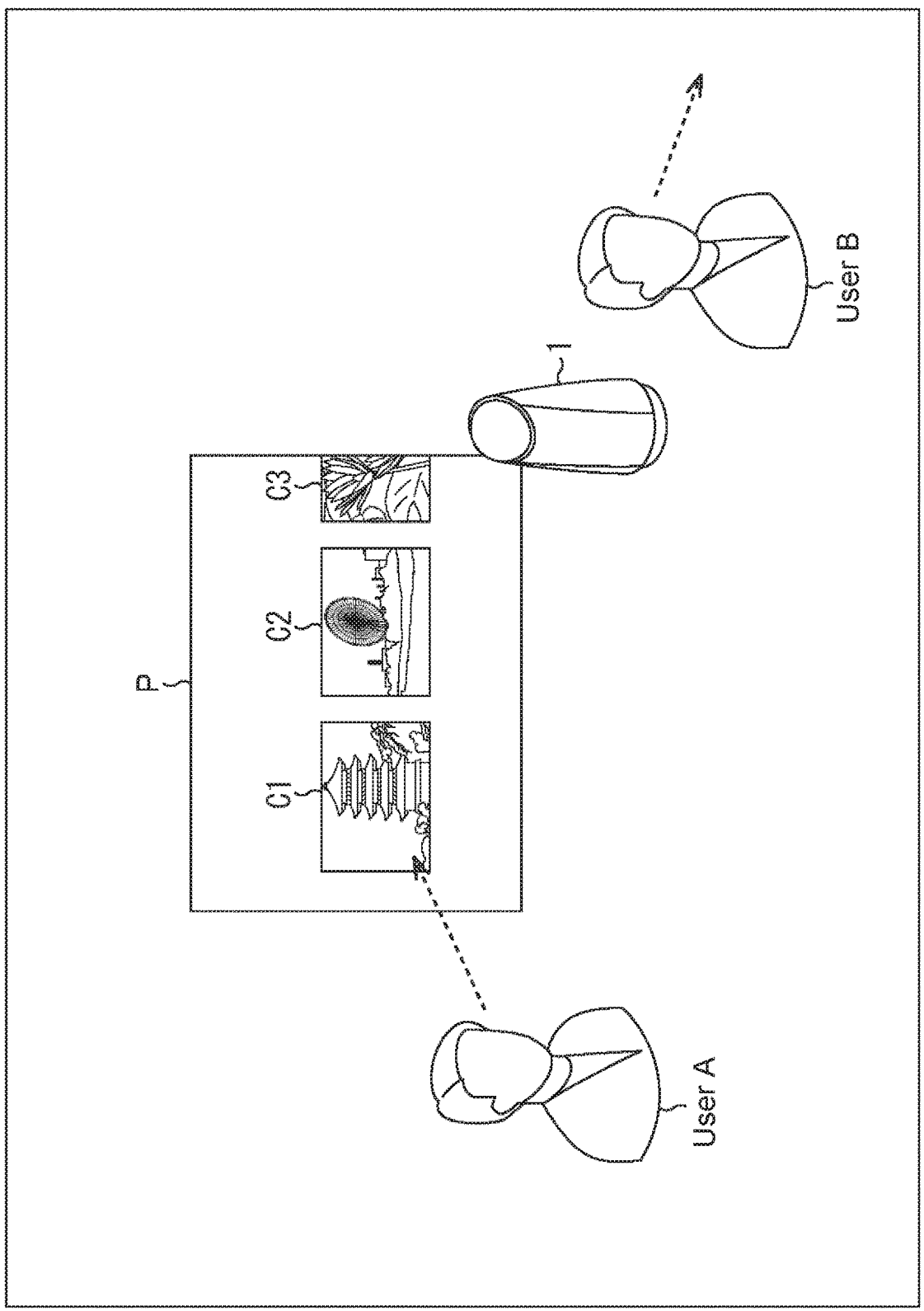
FIG. 15 is a diagram showing an example of presenting the recommended content in a case where there are a plurality of users.

FIG. 15 is a diagram showing an example of presenting information in a case where there are a plurality of users.

In the example of FIG. 15, it is assumed that a user A and a user B are around the information processing terminal 1 that is performing the slide-show reproduction of images of recommended content items. Each of the user A and the user B is a user who is performing predetermined work.

It should be noted that images of respective recommended content items C1 to C3 are displayed on an image P displayed by the information processing terminal 1. The images of the recommended content items C1 to C3 are displayed, for example, so as to move from the left to the right. In such a manner, the slide-show reproduction may be performed by not switching the images of the recommended content items one by one in sequence but moving the sequence of the images of a plurality of recommended content items in a certain direction.

Figure 16:
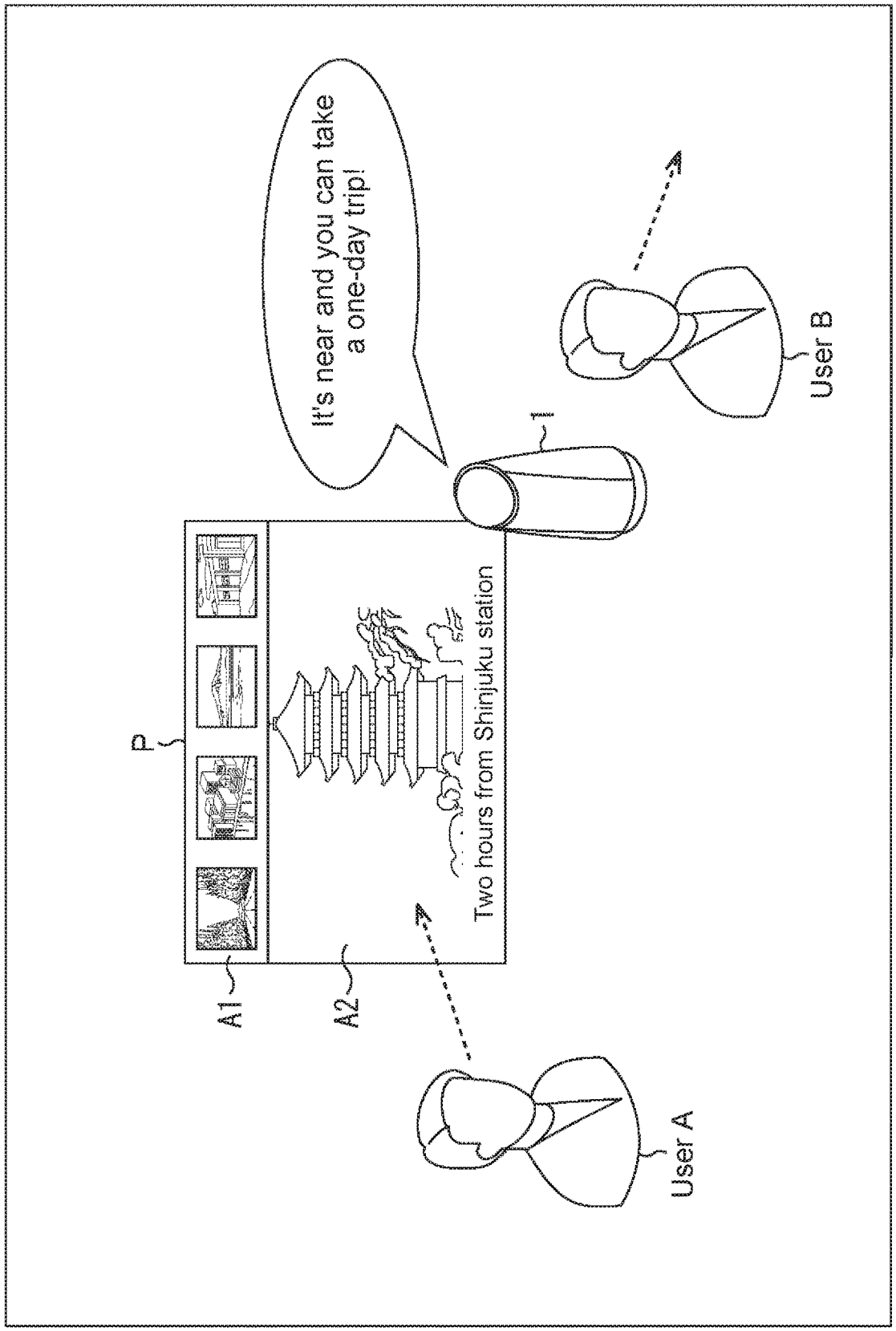
FIG. 16 is a diagram showing an example of presenting the recommended content according to the attention state.

As indicated by the arrow of the broken line in FIG. 15, in a case where the user A turns the line of sight to the image of the recommended content item C1, as shown in FIG. 16, the image P is divided into a region A1 and a region A2, and the presentation of the recommended content according to the attention state of the user A is performed by using the region A2. In the example of FIGS. 15 and 16, the user B does not turn the line of sight to the image of the recommended content item C1.

In the example of FIG. 16, the image of the recommended content item C1, to which the user' attention is directed, is displayed in the region A2 in an enlarged manner, and a text for display is displayed to be superimposed on the image of the recommended content item C1. Further, along with the display of the image of the recommended content item C1, a narration sound for explaining the matter of the recommended content item C1 is output as shown in a speech balloon.

In the region A1, the slide-show reproduction of the images of the recommended content items is continued.

In such a manner, the screen displayed by the information processing terminal 1 may be divided into a plurality of regions, and the presentation corresponding to the attention state of the user whose line of sight is directed to the recommended content may be performed by using a predetermined region.

As in a case where information of the recommended content item C1 is transmitted to a portable terminal carried by the user A whose line of sight is directed to the recommended content item C1, detailed information of the recommended content may be transmitted to a terminal of a user whose attention is focused.

In this case, in addition to the output modal of the screen display and the sound output, the output modal of transmitting information to a portable terminal is used to perform the presentation of recommended content.

The matter of recommended content to be presented by using the output of a sound may be controlled according to a level at which the user concentrates on the work. For example, as the level at which the user concentrates on the work increases, the matter to be output is switched in the order of the output of BGM, the output of a brand sound, and the output of a narration sound (BGM<brand sound<narration).

In a case where the images of the recommended content items are displayed in the slide-show format, at the display start, an image of a color tone that does not affect the color tone of the space may be displayed, and when the user's attention is focused, an image desired to be presented to the user may be displayed.

For example, an image of a color tone that suits the color tone of a room, or an image of a color tone that suits the color tone of an image of the recommended content that has been presented so far are displayed at the start of displaying the images of the recommended content. The images of the recommended content may be processed to generate an image of such a color tone.

For example, in a case where the color tone of the room is a pink-based color tone, a filter used for generating a pink-based image is applied to the image of the recommended content, so that an image for the display start is generated. In a case where the pink-based image generated by being subjected to such filter processing is performed, when the user's attention is focused, the original image of the recommended content is displayed.

OTHER EXAMPLES

Hereinabove, each processing for presenting the recommended content is performed by the information processing terminal 1 and the information presentation server 2, but at least a part of the functions of the above-mentioned information processing terminal 1 may be provided to the information presentation server 2.

In this case, at least a part of the functional unit of the information processing unit 71 shown in FIG. 10 is provided to the information presentation server 2.

Figure 17:
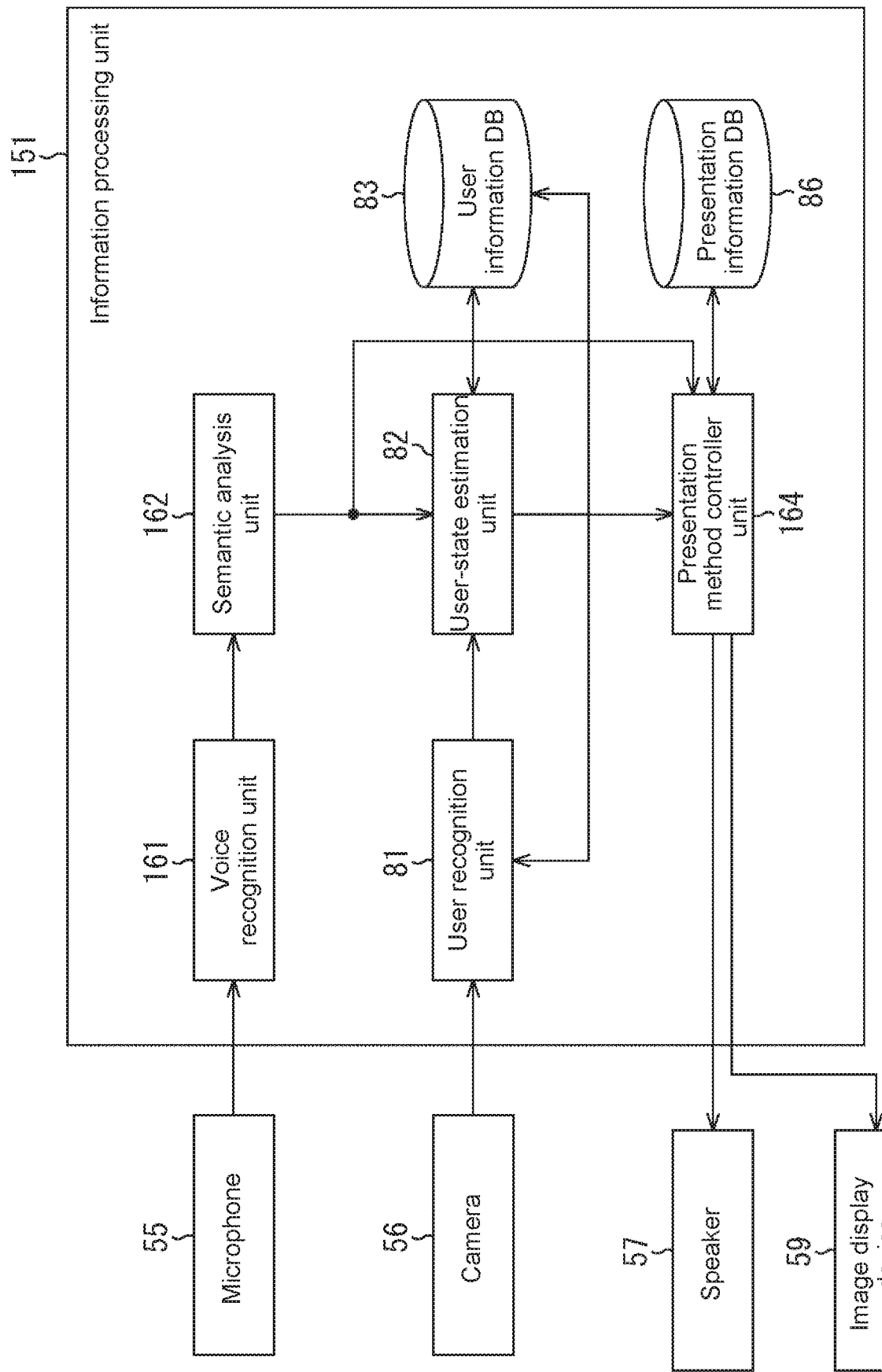
FIG. 17 is a diagram showing another functional configuration example of the information presentation server.

FIG. 17 is a diagram showing another functional configuration example of the information presentation server 2.

A configuration of an information processing unit 151 shown in FIG. 17 is different from the configuration described with reference to FIG. 12 in that the user recognition unit 81, the user-state estimation unit 82, and the user information DB 83 are additionally provided. In a case of the example of FIG. 17, the recognition of a user and the estimation of the attention state of the user are performed in the information presentation server 2 on the basis of the information (image photographed by camera 56) transmitted from the information processing terminal 1.

Figure 18:
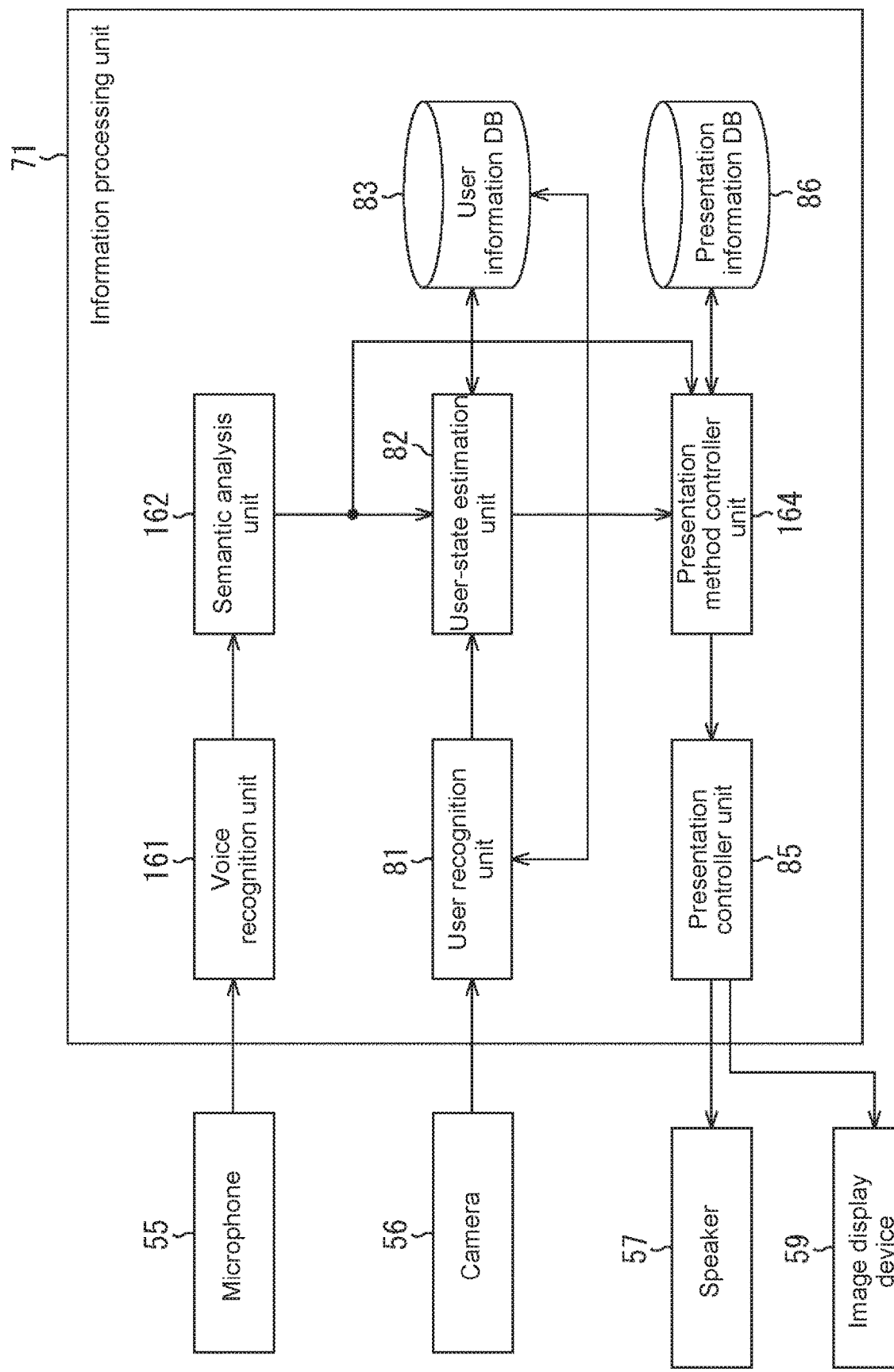
FIG. 18 is a diagram showing another functional configuration example of the information processing terminal.

FIG. 18 is a diagram showing another functional configuration example of the information processing terminal 1.

A configuration of an information processing unit 71 shown in FIG. 18 is different from the configuration described with reference to FIG. 10 in that the voice recognition unit 161, the semantic analysis unit 162, the presentation information DB 163, and the presentation method controller unit 164 are additionally provided in a case of the example of FIG. 18, voice recognition, a semantic analysis of the details of a speech, and control of a presentation method are performed by the information processing terminal 1 itself.

In such a manner, it is arbitrarily selectable which configuration among the configurations of the information processing unit 71 and the information processing unit 151 is provided to each of the information processing terminal 1 side and the information presentation server 2 side.

The series of processing described above can be executed by hardware or executed by software. In the case where the series of processing is executed by software, a program constituting the software is installed from a program recording medium in a computer built in dedicated hardware, a general-purpose personal computer, or the like.

A program to be installed is provided by being recorded on the removable medium 111 shown in FIG. 11, such as an optical disc (CD-ROM (Compact Disc-Read Only Memory), a DVD (Digital Versatile Disc) or the like), or a semiconductor memory. Further, the program to be installed may be provided via a wired or wireless transmission medium such as a local area network, the Internet, and digital broadcasting. The program can be installed in advance in the ROM 102 or the storage unit 108.

It should be noted that the program to be executed by the computer may be a program that is processed chronologically along the order described in this specification or may be a program that is processed in parallel or at a necessary timing such as when an invocation is performed.

In this specification, a system means an aggregation of a plurality of constituent elements (apparatus, module (parts), and the like), regardless of whether all constituent elements are included in the same casing or not. Therefore, a plurality of apparatuses housed in separate casings and connected to one another via a network is a system, and one apparatus including a plurality of modules in one casing is also a system.

The effects described herein are merely exemplary ones and are not restrictive ones, and any other effects may be produced.

The embodiment of the present technology is not limited to the embodiment described above and can be variously modified without departing from the gist of the present technology.

For example, the present technology can have a configuration of cloud computing in which a plurality of apparatuses share one function and cooperate to perform processing via a network.

Further, the steps described in the flowcharts described above can be executed by one apparatus or shared and executed by a plurality of apparatuses.

Furthermore, in the case where one step includes a plurality of processing steps, the plurality of processing steps in one step can be executed by one apparatus or shared and executed by a plurality of apparatuses.

Combination Example of Configurations

The present technology can have the following configurations.

(1) An information processing terminal, including:

an estimation unit that estimates an attention state of a user; and a presentation controller unit that switches an output modal of content to be presented to the user according to the attention state of the user.

(2) The information processing terminal according to (1), in which the presentation controller unit causes the content to be output by using at least one of display of a screen or output of a sound as the output modal.

(3) The information processing terminal according to (2), in which the presentation controller unit causes, in a case where an image regarding the content is displayed and when an attention of the user is directed to the content, display of the image to be continued and a sound regarding the content, to be output.

(4) The information processing terminal according to (3), in which the presentation controller unit further causes a text regarding the content to be displayed together with the image.

(5) The information processing terminal according to (4), in which the presentation controller unit causes the sound to be output, the sound being obtained by performing speech synthesis of another text different from the text displayed together with the image.

(6) The information processing terminal according to (5), in which the presentation controller unit presents quantitative information regarding the content to the user by using the text.

(7) The information processing terminal according to any one of (3) to (6), in which the estimation unit estimates, in a case where a line of sight of the user is directed to the image for a predetermined period of time or longer, that the attention of the user is directed to the content.

(8) The information processing terminal according to any one of (2) to (7), in which the presentation controller unit causes, in a case where an image regarding the content is displayed and when an attention of the user is intermittently directed to the content, a sound regarding the content to be output.

(9) The information processing terminal according to any one of (2) to (8), in which the presentation controller unit causes a plurality of images regarding the plurality of content items to be displayed in sequence and causes, when an attention of the user is not directed to the content, display of the plurality of images to be continued.

(10) The information processing terminal according to (9), in which the presentation controller unit causes, in a case where predetermined information necessary to be presented to the user is output, a sound regarding the predetermined information to be output.

(11) An information processing method, including:
by an information processing terminal,
estimating an attention state of a user; and
switching an output modal of content to be presented to the user according to the attention state of the user.

(12) An information processing apparatus, including:
a communication unit that
transmits content to an information processing terminal connected via a network, and
receives information indicating a state of a user during presentation of the content, the information being transmitted from the information processing terminal; and
a presentation controller unit that
transmits presentation control information to the information processing terminal, the presentation control information specifying a presentation method for the content according to an attention state of the user with respect to the content, and
controls an output modal of the content in the information processing terminal.

(13) An information processing method, including:
by an information processing apparatus, transmitting content to an information processing terminal connected via a network;
receiving information indicating a state of a user during presentation of the content, the information being transmitted from the information processing terminal;
transmitting presentation control information to the information processing terminal, the presentation control information specifying a presentation method for the content according to an attention state of the user with respect to the content; and
controlling an output modal of the content in the information processing terminal.

REFERENCE SIGNS LIST 1 information processing terminal
2 information presentation server
51 CPU
55 microphone
56 camera
57 speaker
58 display
59 image display device
71 information processing unit
81 user recognition unit
82 user-state estimation unit
83 user information DB
84 communication controller unit
85 presentation controller unit
151 information processing unit
161 voice recognition unit
162 semantic analysis unit
163 presentation information DB
164 presentation method control unit

The invention claimed is:

1. An information processing terminal, comprising:
an estimation unit configured to estimate an attention state of a user; and
a presentation controller unit configured to switch an output modal of content to be presented to the user according to the attention state of the user,
wherein the presentation controller unit switches, based on the attention state of the user, between 1) causing a plurality of images regarding the content to be displayed in sequence and switched at predetermined time intervals, and 2) stopping the plurality of images to be switched at the predetermined time intervals and continue displaying only one image of the plurality of images, and
wherein the estimation unit and the presentation controller unit are each implemented via at least one processor.

2. The information processing terminal according to claim 1, wherein
the presentation controller unit is further configured to cause the content to be output by using at least one of display of a screen or output of a sound as the output modal.

3. The information processing terminal according to claim 2, wherein the presentation controller unit is further configured to cause, in a case where an image regarding the content is displayed and when an attention of the user is directed to the content, display of the one image to be continued and a sound regarding the content to be output.

4. The information processing terminal according to claim 3, wherein
the presentation controller unit is further configured to cause a text regarding the content to be displayed together with the one image.

5. The information processing terminal according to claim 4, wherein
the presentation controller unit is further configured to cause the sound to be output, the sound being obtained by performing speech synthesis of another text different from the text displayed together with the one image.

6. The information processing terminal according to claim 5, wherein
the presentation controller unit is further configured to present quantitative information regarding the content to the user by using the text.

7. The information processing terminal according to claim 3, wherein
the estimation unit is further configured to estimate, in a case where a line of sight of the user is directed to the one image for a predetermined period of time or longer, that the attention of the user is directed to the content.

8. The information processing terminal according to claim 2, wherein
the presentation controller unit is further configured to cause, in a case where an image regarding the content is displayed and when an attention of the user is intermittently directed to the content, a sound regarding the content to be output.

9. The information processing terminal according to claim 2, wherein
the presentation controller unit is further configured to cause, when an attention of the user is not directed to the content, display of the plurality of images to be continued.

10. The information processing terminal according to claim 9, wherein
the presentation controller unit is further configured to cause, in a case where predetermined information necessary to be presented to the user is output, a sound regarding the predetermined information to be output.

11. An information processing method, comprising:
by an information processing terminal,
estimating an attention state of a user; and
switching an output modal of content to be presented to the user according to the attention state of the user,
wherein the switching of the output modal of the content to be presented includes switching, based on the attention state of the user, between 1) causing a plurality of images regarding the content to be displayed in sequence and switched at predetermined time intervals, and 2) stopping the plurality of images to be switched at the predetermined time intervals and continue displaying only one image of the plurality of images.

12. An information processing apparatus, comprising:
a communication unit configured to
transmit content to an information processing terminal connected via a network, and
receive information indicating a state of a user during presentation of the content, the information being transmitted from the information processing terminal; and
a presentation controller unit configured to
select, based on the attention state of the user, between generating presentation control information that specifies a presentation method that 1) causes a plurality of images regarding the content to be displayed in sequence and switched at predetermined time intervals, and 2) stops the plurality of images to be switched at the predetermined time intervals and continues displaying only one image of the plurality of images,
transmit the presentation control information to the information processing terminal, and
control an output modal of the content in the information processing terminal,
wherein the communication unit and the presentation controller unit are each implemented via at least one processor.

13. An information processing method, comprising:
by an information processing apparatus,
transmitting content to an information processing terminal connected via a network;
receiving information indicating a state of a user during presentation of the content, the information being transmitted from the information processing terminal;
selecting, based on the attention state of the user, between generating presentation control information that specifies a presentation method that 1) causes a plurality of images regarding the content to be displayed in sequence and switched at predetermined time intervals, and 2) stops the plurality of images to be switched at the predetermined time intervals and continues displaying only one image of the plurality of images;
transmitting presentation control information to the information processing terminal; and
controlling an output modal of the content in the information processing terminal.

* * * * *